United States Patent [19]

Ishizuka et al.

[11] Patent Number: 5,661,296

[45] Date of Patent: Aug. 26, 1997

[54] ROTARY ENCODER MEASURING SUBSTANTIALLY COINCIDING PHASES OF INTERFERENCE LIGHT COMPONENTS

[75] Inventors: Koh Ishizuka, Ohmiya; Yasushi Kaneda, Tokyo, both of Japan

[73] Assignee: Canon Kabushiki Kaisha, Tokyo, Japan

[21] Appl. No.: 724,220

[22] Filed: Oct. 2, 1996

Related U.S. Application Data

[63] Continuation of Ser. No. 329,189, Oct. 26, 1994, abandoned.

[30] Foreign Application Priority Data

Oct. 29, 1993 [JP] Japan ................................ 5-293912

[51] Int. Cl.$^6$ ................................................. G01B 9/22
[52] U.S. Cl. ................................ 250/231.14; 250/231.16; 250/237 G; 356/356
[58] Field of Search .......................... 250/237 G, 231.13, 250/231.14, 231.16, 231.17; 356/356

[56] References Cited

U.S. PATENT DOCUMENTS

| | | | |
|---|---|---|---|
| 4,503,187 | 3/1985 | Grotts . | |
| 4,930,895 | 6/1990 | Nishimura et al. | 356/356 |
| 4,933,673 | 6/1990 | Ishizuka et al. | 341/13 |
| 4,975,570 | 12/1990 | Nishimura et al. | 250/231.16 |
| 4,979,826 | 12/1990 | Ishizuka et al. | 356/356 |
| 4,988,864 | 1/1991 | Michel et al. | 250/231.16 |
| 5,009,506 | 4/1991 | Spies | 356/356 |
| 5,026,985 | 6/1991 | Ishizuka et al. | 250/231.16 |
| 5,051,579 | 9/1991 | Tsukiji et al. | 250/231.16 |
| 5,067,816 | 11/1991 | Ichikawa | 356/373 |
| 5,146,085 | 9/1992 | Ishizuka et al. | 250/231.16 |
| 5,151,585 | 9/1992 | Siebert | 250/201.9 |
| 5,155,355 | 10/1992 | Kabaya | 250/237 G |
| 5,159,192 | 10/1992 | Nishimura et al. | 250/231.16 |
| 5,198,873 | 3/1993 | Ishizuka et al. | 356/356 |
| 5,283,434 | 2/1994 | Ishizuka et al. | 250/237 G |
| 5,302,821 | 4/1994 | Igaki et al. | 250/237 G |
| 5,315,104 | 5/1994 | Plumb | 250/214.1 |
| 5,323,001 | 6/1994 | Igaki et al. | 250/231.16 |
| 5,327,218 | 7/1994 | Igaki | 356/356 |
| 5,390,022 | 2/1995 | Ishizuka et al. | 356/356 |
| 5,428,217 | 6/1995 | Nakajima et al. | 250/214.1 |

FOREIGN PATENT DOCUMENTS 0565056  10/1993  European Pat. Off. .
56-163412  12/1981  Japan .

*Primary Examiner*—Stephone B. Allen
*Attorney, Agent, or Firm*—Fitzpatrick, Cella, Harper & Scinto

[57] ABSTRACT

A rotary encoder has a disk with fine gratings comprising diffraction gratings of small diameters and a high density. Two diffraction lights of predetermined orders which are obtained when a light beam is irradiated to the fine gratings, are interfered properly with each other, thereby enabling rotational information of a rotary object to be detected at a high resolution while realizing a small and thin size of the overall apparatus.

20 Claims, 9 Drawing Sheets

ROTARY ENCODER MEASURING SUBSTANTIALLY COINCIDING PHASES OF INTERFERENCE LIGHT COMPONENTS

This application is a continuation of application Ser. No. 08/329,189, filed Oct. 26, 1994, now abandoned.

BACKGROUND OF THE INVENTION

1. Field of the Invention

The invention relates to a rotary encoder and, more particularly, to a rotary encoder suitable for measuring a rotational speed, a rotational displacement, or the like of a rotary object such that when a laser beam or a light beam from a laser diode, an LED, or the like enters a radial diffraction grating of a disk attached to a rotary object (scale), a diffraction light of a predetermined order from the radial diffraction grating is subjected to a phase modulating function according to the rotational speed or rotational direction of the disk.

2. Related Background Art

Hitherto, there is a rotary encoder as a measuring instrument which can measure rotational information such as rotational amount, rotating direction, or the like of a rotary object in an NC machine tool or the like at a high precision, for example, on a submicron unit basis. Such a rotary encoder is used in various fields.

Particularly, as a rotary encoder of a high precision and a high resolution, there has widely been known a rotary encoder of the diffraction light interference system such that a coherent light beam such as a laser beam or the like enters a diffraction grating provided for a moving object, diffraction lights of predetermined orders generated from the diffraction grating are mutually interfered, and the number of bright and dark portions of the resultant interference fringe is counted,. thereby obtaining a moving state such as movement amount, movement information, or the like of the moving object.

In such a kind of rotary encoder of the diffraction light interference system, when realizing a high resolution and a high precision by using fine gratings (radial gratings), only the diffraction lights of specific orders are extracted by the optical system among a number of diffraction lights generated from the fine gratings and optical paths are overlapped by proper optical means, thereby obtaining an interference signal.

In the rotary encoder, the following conditions are generally required.

(1-a) By using a disk (rotary disk) on which radial gratings of small diameters have been recorded at a high density, a high resolution and a low inertia are obtained.

(1-b) The whole apparatus is thin and small.

(1-c) The encoder is of the unit type such that a disk and a detecting head and the like can be separated and directly assembled into an object to be measured, and when they are assembled, they can be easily handled.

On the other hand, in European Patent Publication No. 0565056, the applicant of the present invention has already proposed a linear encoder in which diffraction light beams which are reflected and diffracted from a scale are properly interfered, thereby miniaturizing the entire apparatus.

SUMMARY OF THE INVENTION

It is the first object of the present invention to further improve the linear encoder already proposed by the applicant of the invention and to provide a rotary encoder in which a disk having fine gratings comprising diffraction gratings (radial gratings) of small diameters and a high density is used and two diffraction lights of predetermined orders which are obtained when a light beam is irradiated to the fine gratings are mutually properly interfered, thereby enabling rotational information of a rotary object (disk) to be detected at a high resolution while realizing a small and thin shape of the entire apparatus.

The above and other objects and features of the present invention will become apparent from the following detailed description and the appended claims with reference to the accompanying drawings.

DETAILED DESCRIPTION OF THE PREFERRED EMBODIMENTS

Figure 1:
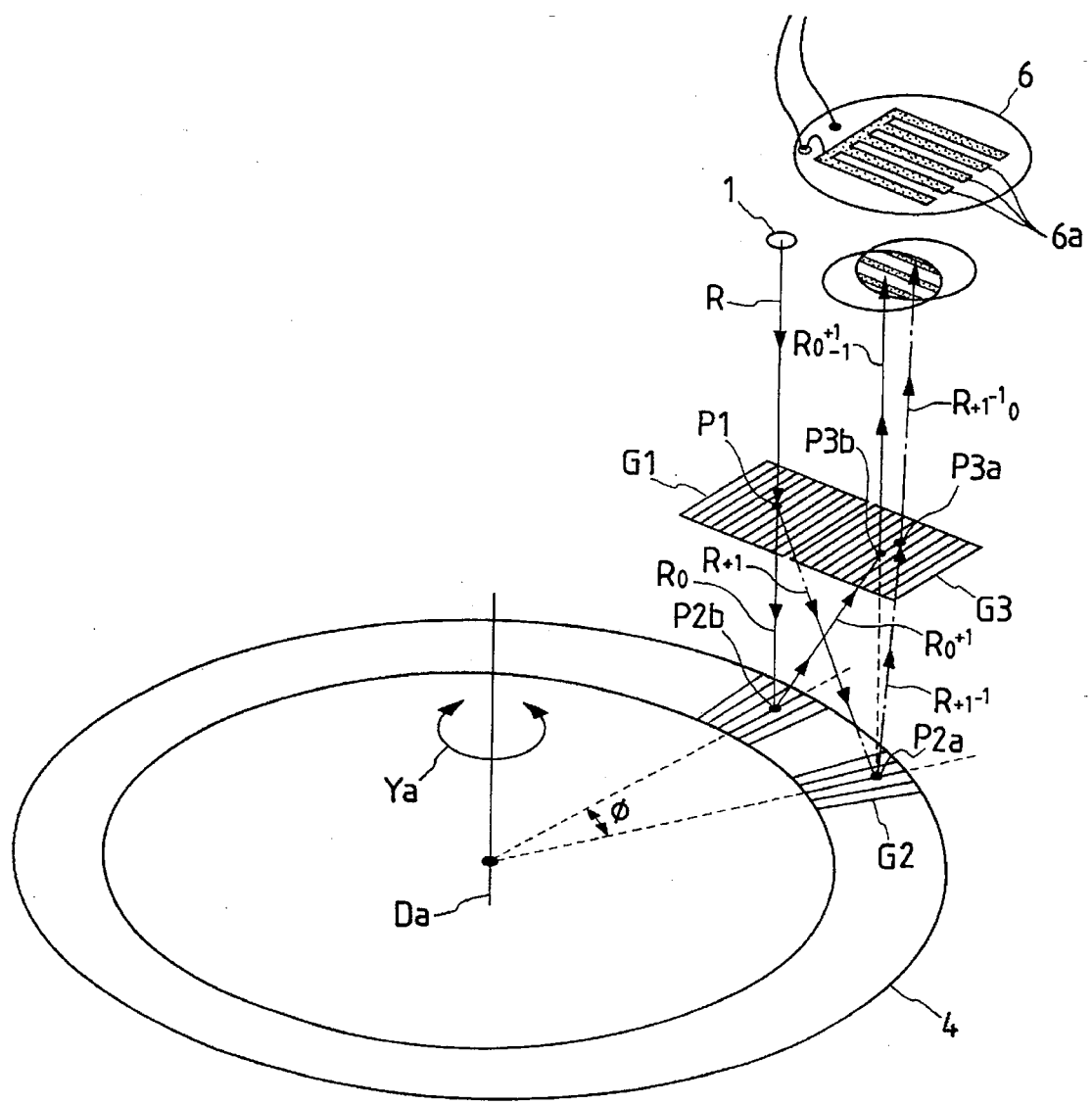
FIG. 1 is a perspective view of a main section of an embodiment 1 of the present invention.

FIG. 1 is a perspective view of a main section of an embodiment of the invention.

In the drawing, a light beam R radiated from a light emitting device (light source) 1 such as laser diode, light emitting diode, or the like is converted to a parallel light through an optical system (not shown) and is irradiated to a point P1 on a diffraction grating G1 comprising a linear grating.

Among a plurality of diffraction lights diffracted by the diffraction grating G1, a +1st order diffracted light $R_{+1}$ and a 0th-order diffraction light $R_0$ are allowed to enter points P2a and P2b on a radial diffraction grating G2 on a disk 4 coupled to a rotary object (not shown) which rotates around a rotary-axis Da as a rotational center as shown by an arrow Ya.

A light beam $R_{+1}^{-1}$ which was −1st order diffracted at the point P2a of the radial diffraction grating G2 is allowed to enter a point P3a on a diffraction grating G3 comprising a linear grating. A light beam $R_0^{+1}$ which was +1st order diffracted at the point P2b of the radial diffraction grating G2 is allowed to enter a point P3b on the diffraction grating G3.

In the diffraction grating G3, arranging azimuths (arranging directions of the gratings) of the gratings at the points P3a and P3b are set so as to be parallel with an arranging azimuth of the grating of the diffraction grating G1. The arranging azimuths of the gratings of the diffraction gratings G1 and G3 are set so as to be parallel with the arranging azimuth at the irradiating point P2a of the radial diffraction grating G2.

In the embodiment, the diffraction gratings G1 and G3 are constructed by linear gratings on the same board surface. The point P1 and the points P3a, P3b are set so as to be located at different positions of the linear gratings on the same board surface.

Since a light beam $R_{+1}{}^{-1}{}_0$ which was 0th-order diffracted at the point P3a of the diffraction grating G3 has already been emitted with a slight angle for the surface of the disk 4 at the point P2a of the diffraction grating G2, when it is emitted from the diffraction grating G3, it is also extracted with a certain angle relative to such a disk surface.

A light beam $R_0{}^{+1}{}_{-1}$ which was −1st order diffracted at the point P3b of the diffraction grating G3 is extracted from the diffraction grating G3 in the direction perpendicular to the disk surface. That is, in the embodiment, the light beams $R_{+1}{}^{-1}{}_0$ and $R_0{}^{+1}{}_{-1}$ are taken out from the diffraction grating G3 with an angle therebetween. Optical paths of the light beams $R_{+1}{}^{-1}{}_0$ and $R_0{}^{+1}{}_{-1}$ are partially overlapped and interfered and are led to a photosensitive device 6.

A sine-wave-like signal light (interference signal) based on the bright and dark portions of an interference pattern at this time is obtained by the photosensitive device 6. Rotational information of the disk 4 is obtained by using an interference signal from the photosensitive device 6. The photosensitive device 6 is constructed so that a photosensitive surface 6a has an array shape of the same pitch as that of an interference fringe which is formed on the surface of the photosensitive device.

Consequently, the phases of the bright and dark portions of the interference light which enters each rectangular photosensitive device coincide, thus an output signal from the photosensitive device 6 becomes a sine-wave-like signal of two periods when the disk 4 rotates by an angle corresponding to one pitch of the radial diffraction grating G2.

In the embodiment, since the light beam R is the parallel light beam, the photosensitive surface of the photosensitive device is set to a rectangular shape whose width is narrower than the width of the interference fringe pitch and is arranged in an array shape so as to have a pitch P that is specified by the following equation. The photosensitive surfaces of the photosensitive devices are connected in parallel.

$$P = \frac{\lambda}{\left[\sin\left\{\tan^{-1}\left(\frac{d}{R} \cdot \tan^2(\sin^{-1}(N\lambda/2\pi R))\right)\right\}\right]} \quad (1)$$

where, $\lambda$: wavelength of light beam R d: interval between the diffraction grating G1 (G3) and the radial diffraction grating G2

R: distance (radius) between the center of the radial diffraction grating G2 and the irradiating point P2b N: the number of gratings per one circumference of the radial diffraction grating G2

The embodiment has the following features.

(1-1) The optical system, photosensitive device 6, and the like are arranged so as to satisfy the equation (1). The pitch of the interference fringe which is formed on the photosensitive device 6 is equalized to the pitch of the array-like photosensitive surfaces 6a of the photosensitive device 6, thereby allowing the interference light components of the same phase with respect to the time to enter the photoelectric converting region. Thus, a periodic signal of a good S/N ratio is obtained from the photosensitive device.

(1-2) By constructing the diffraction gratings G1 and G3 by linear gratings, they can be easily manufactured.

(1-3) The arranging azimuth of the diffraction grating G1 is set to be parallel with the arranging azimuth at the irradiating point P2a of the radial diffraction grating G2, thereby generating an interference fringe pattern of the interference signal light.

In the embodiment, in case of actually arranging the optical system, by merely deviating the irradiating position P1 of the light beam in the radial direction of the disk 4 while monitoring the output from the photosensitive device 6 and, further, by merely adjusting an attaching angle of the diffraction grating G1 (G3), the maximum contrast can be easily obtained. Thus, there is a feature such that the assembling and attaching works are easy and the component elements can be easily handled.

FIGS. 2 to 5 are perspective views of main sections according to embodiments 2 to 5 in the invention, respectively.

Figure 2:
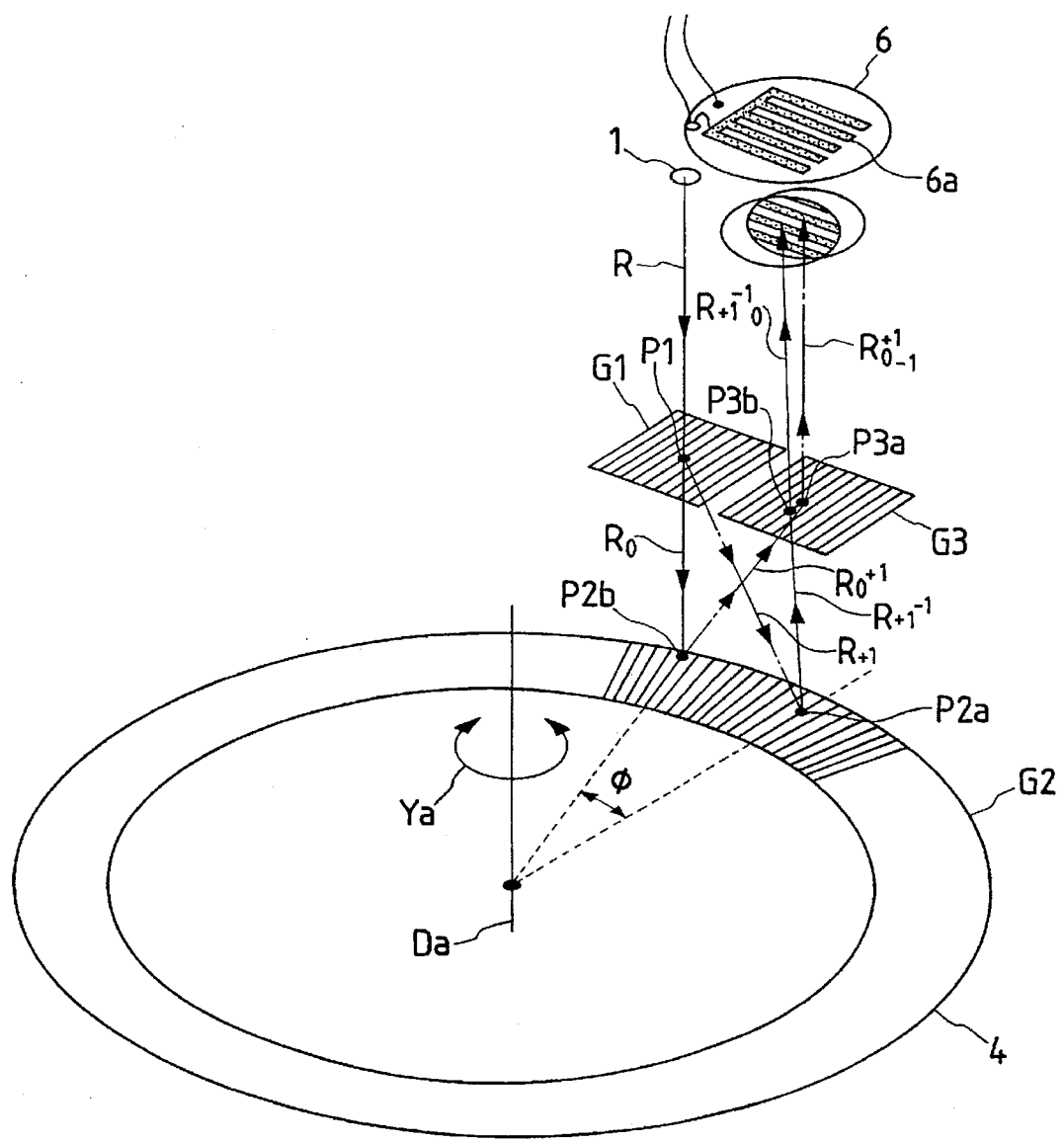
FIG. 2 is a perspective view of a main section of an embodiment 2 of the invention.

The embodiment 2 of FIG. 2 differs from the embodiment 1 of FIG. 1 with respect to a point that the arranging azimuths of the diffraction gratings G1 and G2 are set to be parallel with the arranging azimuth at the irradiating point P2b of the radial diffraction grating G2, thereby generating an interference fringe pattern of the interference signal light. The other constructions are similar to FIG. 1.

In the embodiments 1 and 2, the diffraction grating G1 is arranged so as to be parallel with either one of the arranging azimuths at the irradiating points P2a and P2b on the radial diffraction grating G2 on the rotary disk 4.

Figure 3:
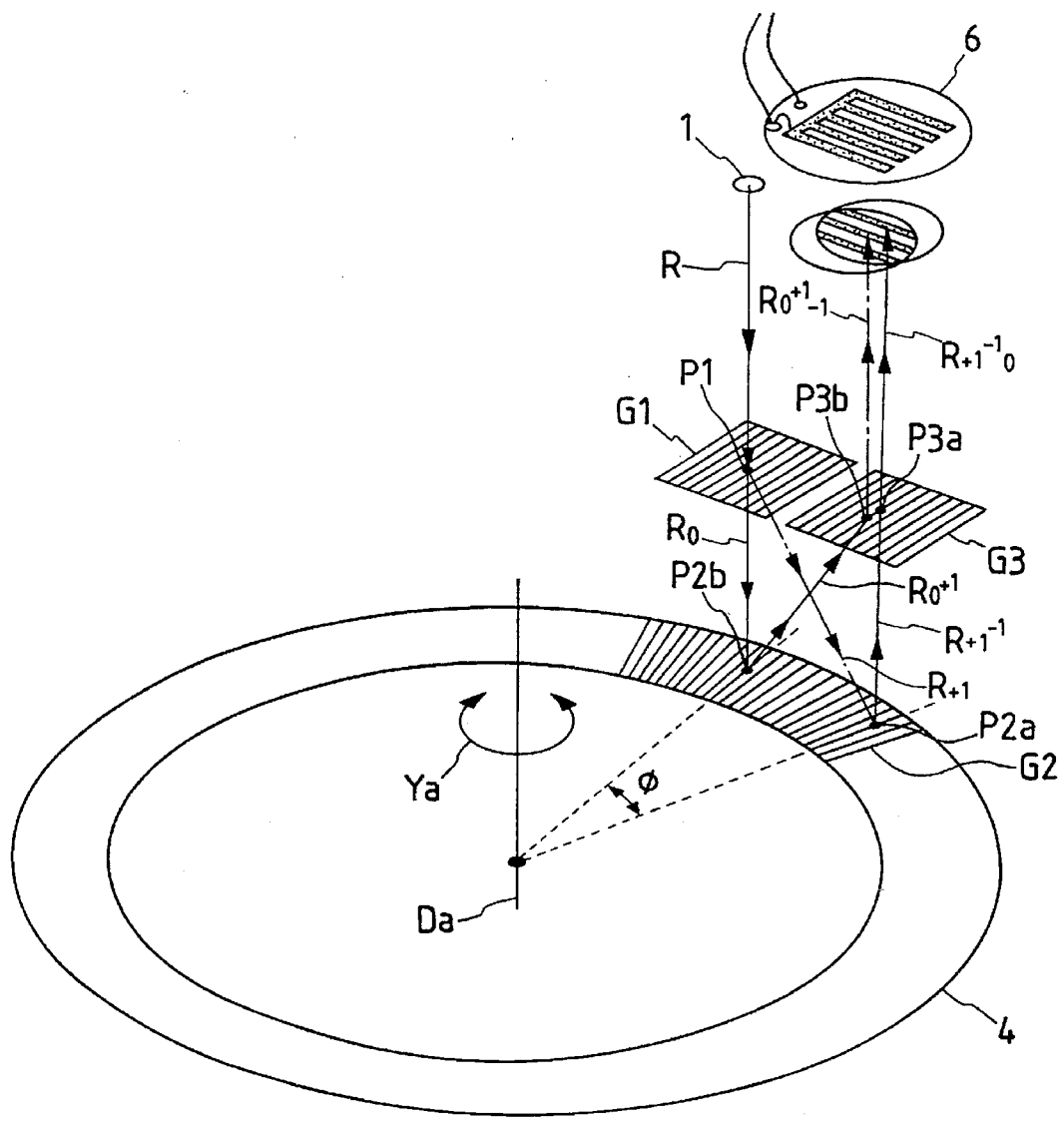
FIG. 3 is a perspective view of a main section of an embodiment 3 of the invention.

The embodiment 3 of FIG. 3 differs from the embodiment 1 of FIG. 1 with respect to a point that the diffraction grating G1 is arranged so as to have an angular difference in the opposite direction for both of the arranging azimuths at the irradiating points P2a and P2b on the radial diffraction grating G2 on the rotary disk, namely, so as to be almost parallel with the arranging azimuth of the diffraction grating G2 at the middle point of the points P2a and P2b. The other constructions are similar to FIG. 1.

Figure 4:
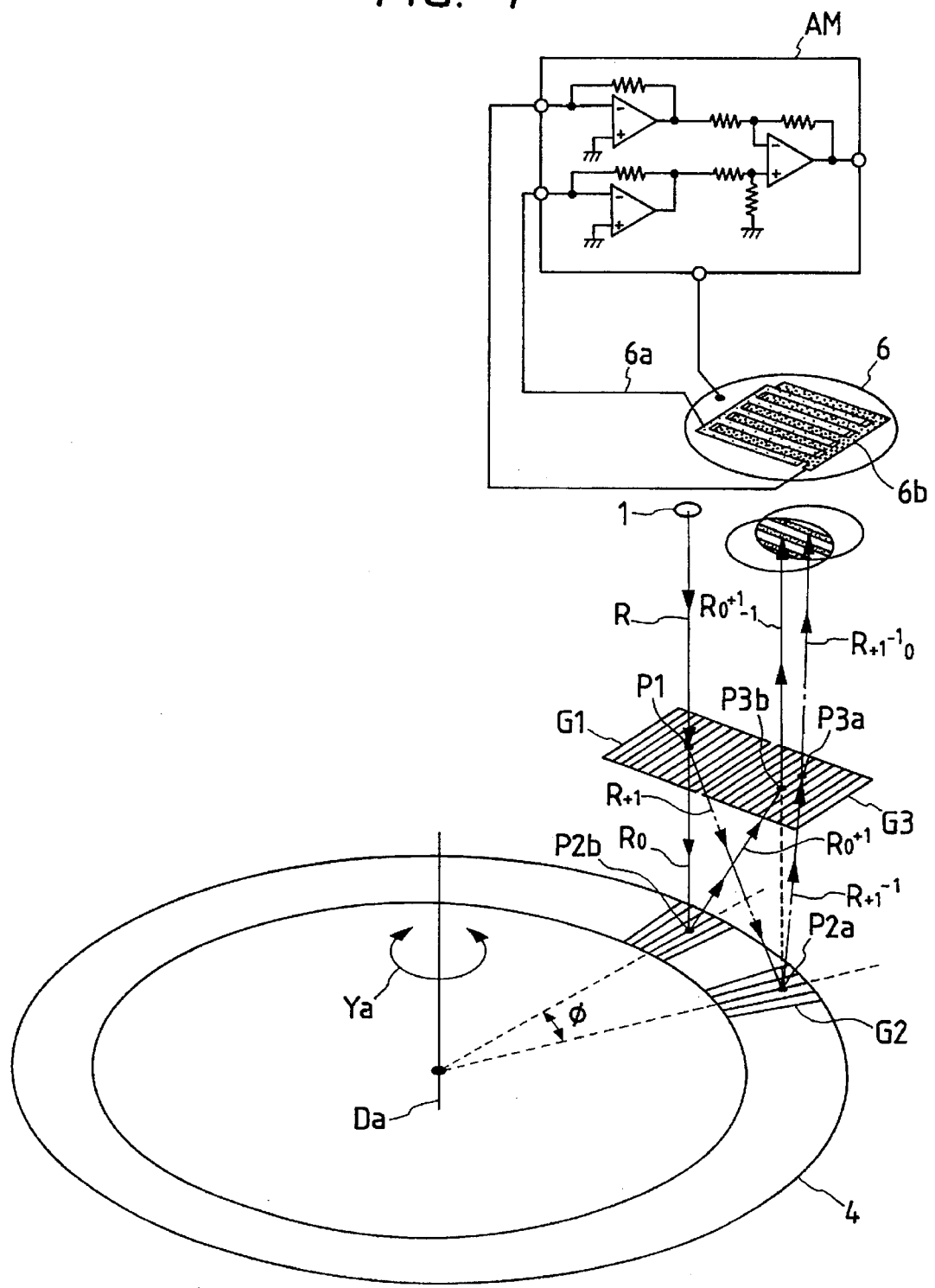
FIG. 4 is a perspective view of a main section of an embodiment 4 of the invention.

The embodiment 4 of FIG. 4 differs from the embodiment 1 of FIG. 1 with respect to a point that the photosensitive device 6 is constructed by two comb-shaped photosensitive surfaces 6a and 6b which are mated with each other and have the same pitch as that of the interference fringe formed on the surface of the photosensitive device 6 and that a difference between the output signals derived from the two photosensitive surfaces 6a and 6b is extracted by a differential amplifying circuit AM and is outputted. The other constructions are similar to the embodiment 1.

The embodiment has the following features.

(4-1) Even when the incident light amount to the photosensitive device fluctuates by an influence due to instability of the output of the light source, an attaching error of the optical system, or the like, an amplitude signal around 0 is always derived as a periodic signal, so that no error occurs when the periodic fluctuation occurs. Consequently, the measurement can be stably performed.

(4-2) When the interval between the diffraction gratings G2 and G1 is narrowed in order to realize the small and thin size, the optical path of the interference light beam which is emitted from the diffraction grating G3 and the optical path for inputting the light beam from the light source to the diffraction grating G1 are close to each other or are overlapped. Thus, for example, the direct reflected light of the light beam entering the diffraction grating G1 from the light source is mixed to the interference signal light. However, since the unnecessary light component as a DC component is cancelled due to the differential detection by the two comb-shaped photosensitive surfaces, the S/N ratio is not deteriorated.

Figure 5:
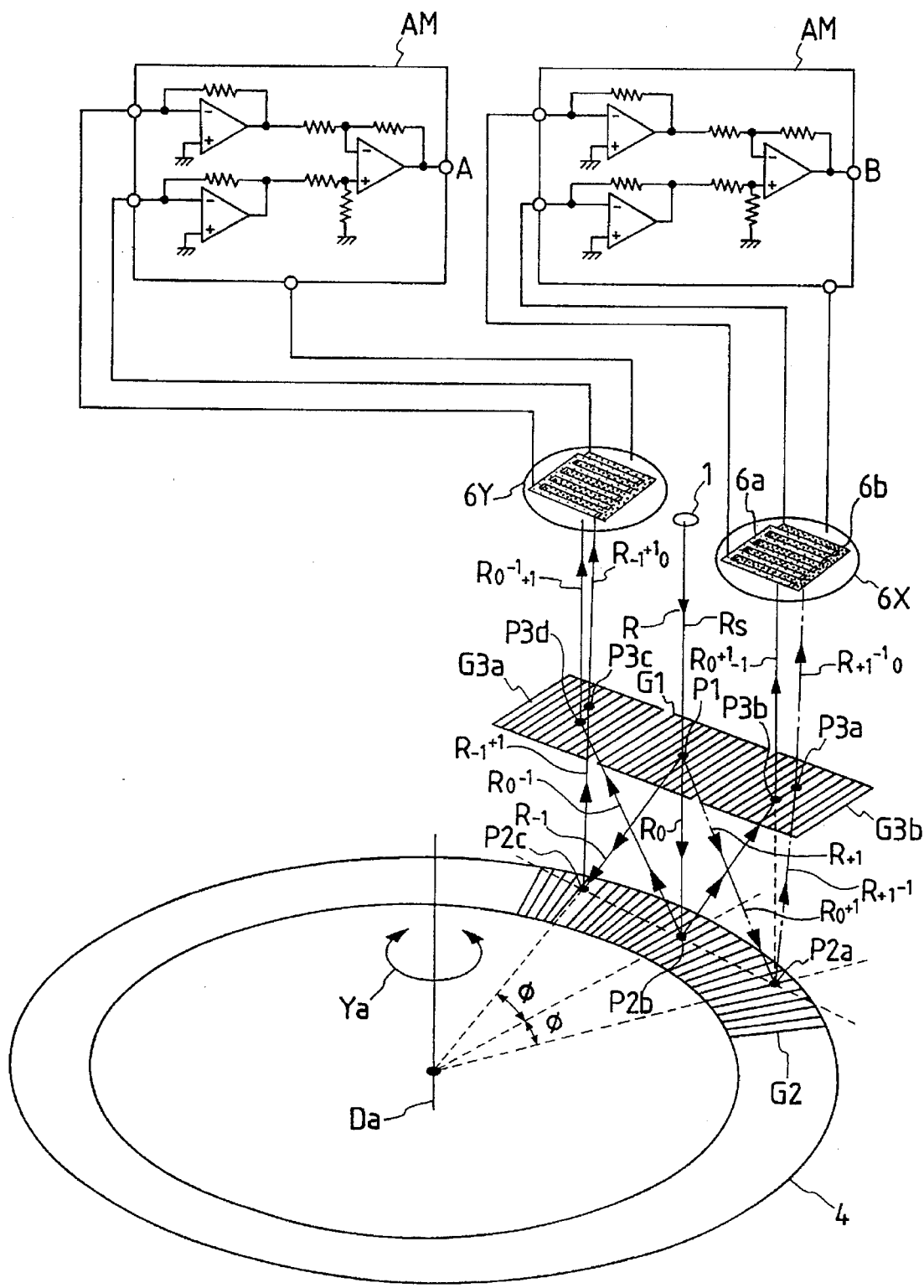
FIG. 5 is a perspective view of a main section of an embodiment 5 of the invention.

The embodiment 5 of FIG. 5 has a construction such that similar diffraction gratings and photosensitive devices are symmetrically arranged around an optical path Rs of the light beam R from the light emitting device 1 in the embodiment 4 of FIG. 4. Namely, three light beams are irradiated onto the diffraction grating G2, thereby forming interference signals on both sides of the optical path Rs.

In the diagram, the light beam R emitted from the light emitting device 1 is irradiated to the point P1 on the diffraction grating G1. The three light beams of the 0-th order diffraction light $R_0$, +1st order diffracted light $R_{+1}$, and −1st order diffracted light $R_{-1}$ which are caused by the light irradiation are respectively irradiated to the points P2a, P2b, and P2c on the radial grating G2 recorded on the disk 4.

The light beam $R_0^{+1}$ which was +1st order diffracted at the point P2b is irradiated to the point P3b on the diffraction grating G3a. The light beam $R_{+1}^{-1}$ which was −1st order diffracted at the point P2a is irradiated to the point P3a on the diffraction grating G3a. A light beam $R_{-1}^{+1}$ which was +1st order diffracted at the point P2c is irradiated to a point P3c on the diffraction grating G3b. A light beam $R_0^{-1}$ which was −1st order diffracted at the point P2b is irradiated to a point P3d on the diffraction grating G3b.

Those electrical periodic signals are sine-wave-like signals of two periods when the disk 4 is rotated by an angle corresponding to one pitch of the radial diffraction grating.

According to the embodiment, since the interference signal light is obtained from two positions of the diffraction grating G1, by arranging diffraction gratings G3a and G3b in a manner such that the phases of the grating arrangement between the diffraction gratings G3a and G3b are deviated by ¼ pitch between (point P3a, point P3b) and (point P3c, point P3d) as shown in FIG. 5, the phases of the bright and dark portions of the interference lights entering the photosensitive devices 6a and 6b can be deviated by 90°. There is, consequently, a feature such that in addition to the rotational speed of the disk 4, the rotating direction can be also judged.

FIGS. 6 to 9 are perspective views of main sections of embodiments 6 to 9 according to the invention.

The embodiments 6 to 9 differ from the embodiment 1 of FIG. 1 mainly with respect to points that the light beams enter the points P3a and P3b of the diffraction grating G3 and the light beam diffracted at the point P3a and the light beam diffracted at the point P3b are extracted so as to be parallel with each other and both of the light beams are overlapped to thereby form an interference fringe and that a photosensitive device comprising a single photosensitive surface is used as a photosensitive device 6. The other constructions are similar to the embodiment 1.

A construction of each embodiment of FIGS. 6 to 9 will now be sequentially described although parts of them are overlapped to the embodiments of FIGS. 1 to 5 mentioned above.

Figure 6:
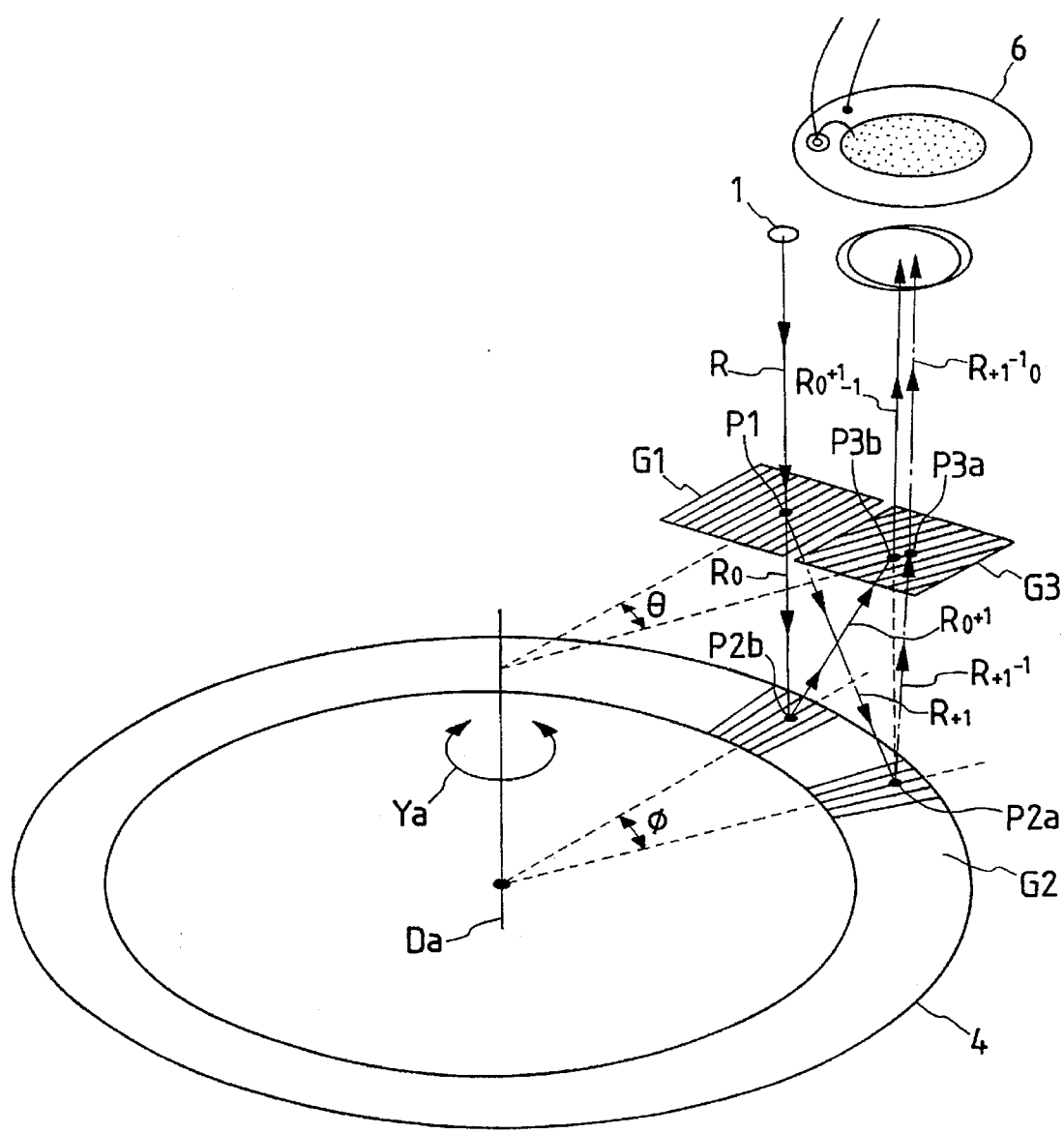
FIG. 6 is a perspective view of a main section of an embodiment 6 of the invention.

In the embodiment 6 of FIG. 6, the light beam R emitted from the light emitting device (light source) 1 such as laser diode, light emitting diode, or the like is converted to the parallel light via an optical system (not shown) and is irradiated onto the point P1 on the diffraction grating G1 comprising the linear grating.

The +1st order diffracted light $R_{+1}$ and the 0-th order diffraction light $R_0$ among a plurality of diffraction lights diffracted by the diffraction grating G1 are allowed to enter the points P2a and P2b on the radial diffraction grating G2 on the disk 4 coupled to a rotary object (not shown) which rotates around the rotary axis Da as a rotational center as shown by the arrow Ya.

The light beam $R_{+1}^{-1}$ which was −1st order diffracted at the point P2a of the radial diffraction grating G2 is allowed to enter the point P3a on the diffraction grating G3 comprising the linear grating.

The light beam $R_0^{+1}$ which was +1st order diffracted at the point P2b of the radial diffraction grating G2 is allowed to enter the point P3b on the diffraction grating G3. The pitches of the diffraction gratings at the points P1 and P2 are equalized. The pitches of the diffraction gratings at the points P2a and P3b are equalized.

The diffraction grating G3 is set so as to have a proper angle difference θ between the arranging azimuths of the gratings of the diffraction grating G3 at the points P3a and P3b and the arranging azimuth of the grating of the diffraction grating G1.

An outgoing azimuth vector of the light beam $R_{+1}^{-1}{}_0$ which was 0-th order diffracted at the point P3a of the diffraction grating G3 is made to coincide with an outgoing azimuth vector of the light beam $R_0^{+1}{}_{-1}$ which was −1st order diffracted at the point P3b of the diffraction grating G3.

Both of the light beams are overlapped to thereby interfere with each other. The interference light is led to the photosensitive device 6. The photosensitive device 6 generates a sine-wave-like signal light based on the bright and dark portions of the interference pattern produced in this instance. A signal processing circuit (not shown) obtains rotational information of the disk 4 by using the signal light.

In the embodiment, now assuming that the disk 4 rotates by an angle corresponding to one pitch of the grating of the radial diffraction grating G2, the sine wave signal of two periods is derived as an electrical periodic signal from the photosensitive device 6.

The embodiment has been shown with respect to the case where the reflected diffraction light by the diffraction grating G2 on the disk 4 is used and the diffraction gratings G1 and G3 are arranged on the same side. However, by using the transmission diffraction light by the diffraction grating G2, the diffraction gratings G1 and G3 can be also arranged so as to face both sides of the diffraction grating G2.

According to the embodiment, the arranging azimuths of the diffraction gratings at the points P3a and P3b on the diffraction grating G3 and at the point P1 on the diffraction grating G1 are set so as to have the proper angle θ, so that the two overlapped light beams from the diffraction grating G3 are made parallel with each other and a uniform interference light beam is derived. Consequently, a periodic signal of a good S/N ratio can be obtained from the photosensitive device.

Thus, the rotational information of the disk 4 can be detected at a high precision.

The embodiment has the following advantages.

(6-1) The diffraction gratings G1 and G3 can be easily manufactured because they are the linear diffraction gratings.

(6-2) The diffraction gratings G1 and G3 can be easily designed because they are the linear diffraction gratings.

(6-3) In case of using the reflected diffraction lights, the apparatus can be further made thin because the diffraction gratings G3 and G1 can be arranged on the same plane.

(6-4) Because of similar reasons, the reading optical head can be arranged on one side of the disk (a construction such that the disk is sandwiched is not used), so that the head can be easily assembled.

(6-5) Because of similar reasons, since the diffraction gratings G3 and G1 can be integrally formed on the same board, the number of parts is reduced and there is no need to adjust the alignment upon assembling. A more stable apparatus can be formed with low costs.

Figure 7:
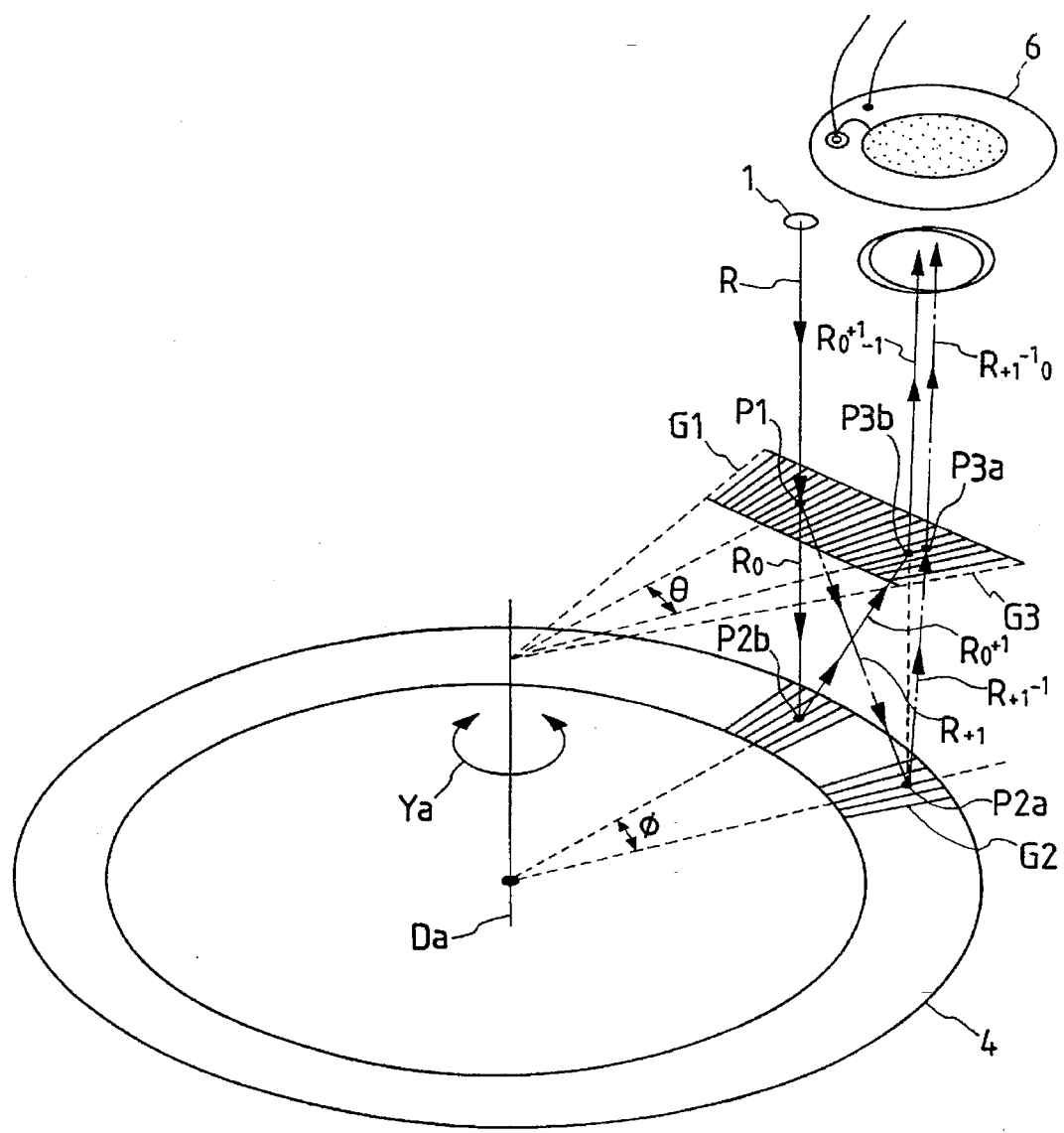
FIG. 7 is a perspective view of a main section of an embodiment 7 of the invention.

The embodiment 7 of FIG. 7 differs from the embodiment 6 of FIG. 6 with respect to a point that the radial diffraction gratings are used as diffraction gratings G1 and G3. The other constructions are similar to the embodiment 6.

In FIG. 7, the light beam R emitted from the light emitting device (light source) 1 such as laser diode, light emitting diode, or the like is converted to the parallel light through an optical system (not shown) and is irradiated to the point P1 on the radial diffraction grating G1. The +1st order diffracted light $R_{+1}$ and the 0-th order diffraction light $R_0$ among a plurality of diffraction lights diffracted by the radial diffraction grating G1 are allowed to enter the points P2a and P2b on the radial diffraction grating G2 on the disk 4 coupled with a rotary object (not shown) which rotates around the rotary axis Da as a rotational center as shown by the arrow Ya.

The light beam $R_{+1}^{-1}$ which was −1st order diffracted at the point P2a of the radial diffraction grating G2 is allowed to enter the point P3a on the radial diffraction grating G3. The light beam $R_0^{+1}$ which was +1st order diffracted at the point P2b on the radial diffraction grating G2 is allowed to enter the point P3b on the radial diffraction grating G3.

The centers of the radial diffraction gratings G1, G2, and G3 are made to coincide and, further, the numbers N of gratings in the case where they are calculated as a whole circumference are equalized.

Therefore, an outgoing azimuth vector of the light beam $R_{+1}^{-1}{}_0$ which was 0-th order diffracted at the point P3a of the diffraction grating G3 is made to coincide with an outgoing azimuth vector of the light beam $R_0^{+1}{}_{-1}$ which was −1st order diffracted at the point P3b of the diffraction grating G3.

Both of the light beams are overlapped to thereby interfere with each other. The interference light is led to the photosensitive device 6.

The photosensitive device 6 generates a sine-wave-like signal light based on the bright and dark portions of an interference pattern produced in this instance. A signal processing circuit (not shown) obtains rotational information of the disk 4 by using the signal light.

In the embodiment, when the disk 4 rotates by an angle corresponding to one pitch of the radial diffraction grating, a sine-wave-like signal of two periods is derived from the photosensitive device 6.

The embodiment has the following features.

(7-1) Since the diffraction gratings G3 and G1 can be constructed by the same radial diffraction grating parts, the number of kinds of parts is reduced and the construction can be simplified.

(7-2) The apparatus is strong against an attaching error. Namely, even if a distance d between the radial diffraction grating G1 (G3) and the disk 4 (diffraction grating G2) fluctuates due to some causes (attaching error, mechanical positional deviation, thermal expansion, etc.), the positions of the points P2a, P2b, P3a, and P3b are merely deviated, and they function so as to preserve a relative parallelism of the outgoing azimuth vectors of two light beams which are emitted from the points P3a and P3b on the diffraction grating G3. Therefore, the interference signal light is not disturbed and a stable signal can be generated.

(7-3) The apparatus is strong against an environmental temperature fluctuation. Namely, even if the environmental temperature fluctuates and the wavelength λ of the light source fluctuates, the positions of the points P2a, P2b, P3a, and P3b are merely deviated and they function so as to preserve a relative parallelism of the outgoing azimuth vectors of two light beams which are emitted from the points P3a and P3b on the diffraction grating G3. Therefore, the interference signal light is not disturbed and a stable signal can be generated.

Figure 8:
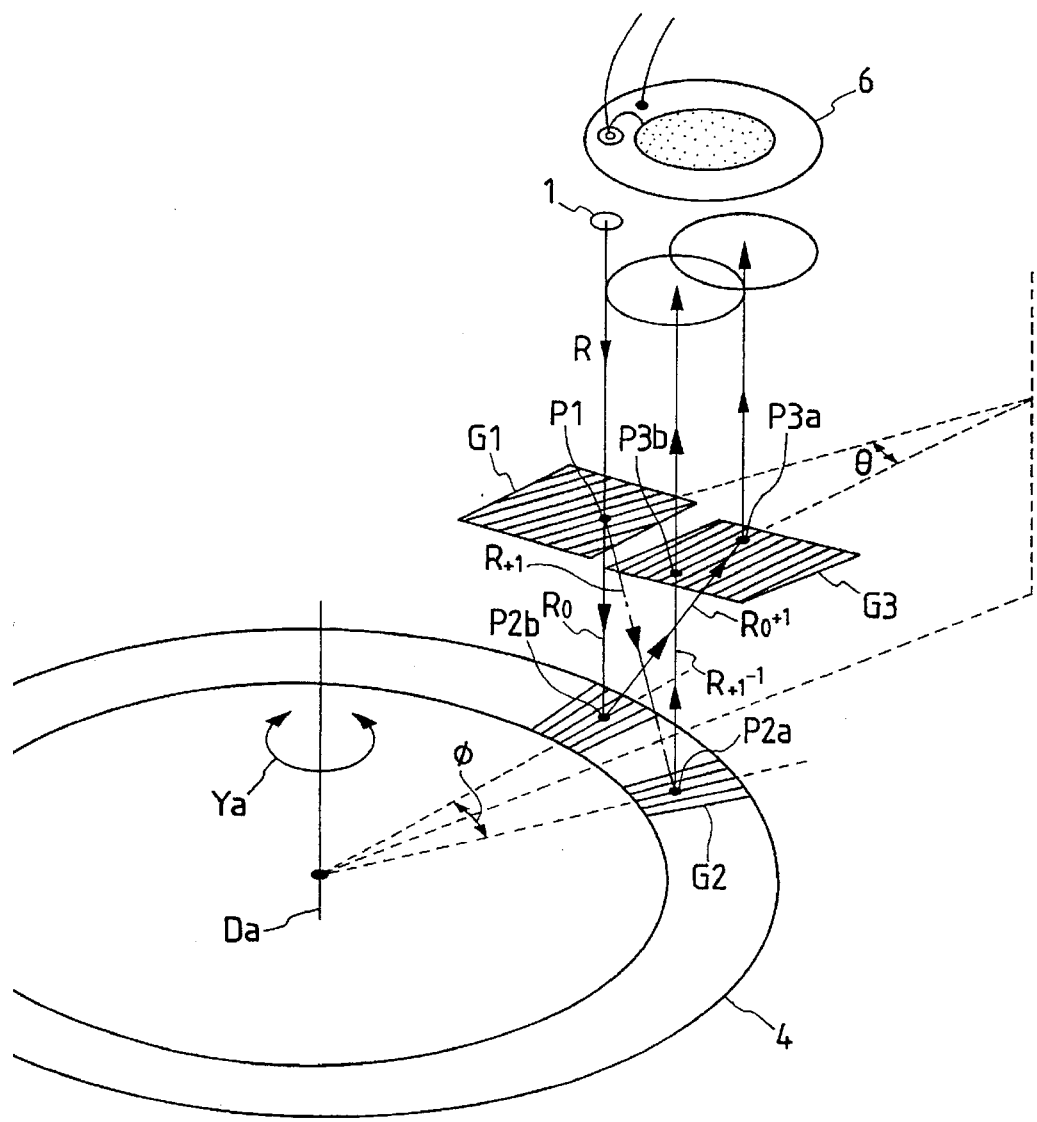
FIG. 8 is a perspective view of a main section of an embodiment 8 of the invention.

The embodiment 8 of FIG. 8 differs from the embodiment 6 of FIG. 6 with respect to a point that the diffraction gratings G1 and G3 comprising the linear gratings are arranged with an angle θ so as to be parallel with each other for the grating arranging azimuths at the positions P2a and P2b on the radial diffraction grating G2 on the rotary disk 4. The other constructions are similar to the embodiment 6.

In FIG. 8, the light beam R emitted from the light emitting device (light source) 1 such as laser diode, light emitting diode, or the like is converted to the parallel beam through an optical system (not shown) and is irradiated to the point P1 on the diffraction grating G1 comprising the linear grating.

The +1st order diffracted light $R_{+1}$ and the 0-th order diffraction light $R_0$ among a plurality of diffraction lights diffracted by the diffraction grating G1 are allowed to enter the points P2a and P2b on the radial diffraction grating G2 on the disk 4 coupled with a rotary object (not shown) which rotates around the rotary axis Da as a rotational center as shown by the arrow Ya.

The light beam $R_{+1}^{-1}$ which was −1st order diffracted at the point P2a of the radial diffraction grating G2 is allowed to enter the point P3a on the diffraction grating G3 comprising the linear grating. The light beam $R_0^{-1}$ which was +1st order diffracted at the point P2b of the radial diffraction grating G2 is allowed to enter the point P3b on the diffraction grating G3.

The arranging azimuth of the grating of the radial diffraction grating G2 at the point P2a is parallel with that of the diffraction grating G1 comprising the linear grating and has the same pitch. The arranging azimuth of the grating of the radial diffraction grating G2 at the point P2b is parallel with that of the diffraction grating G3 comprising the linear grating and has the same pitch.

Therefore, since the 0-th order diffraction light $R_{+1}^{-1}{}_0$ which is derived from the point P3a has already been emitted in the direction perpendicular to the surface of the disk 4, it is also perpendicularly extracted for the linear diffraction grating G3. The −1st order diffracted light $R_0^{+1}{}_{-1}$ which is obtained from the point P3b is emitted in the direction perpendicular to the linear grating G3.

Both of the light beams are overlapped to thereby interfere with each other. The interference light is led to the photosensitive device 6. The photosensitive device 6 generates a sine-wave-like signal light based on the bright and dark portions of the interference pattern in this instance. A signal processing circuit (not shown) obtains rotational information of the disk 4 by using the signal light.

In the embodiment, when the disk 4 rotates by an angle corresponding to one pitch of the radial diffraction grating, the sine-wave-like signal of two periods is obtained from the photosensitive device 6 in a manner similar to the embodiment 6.

Figure 9:
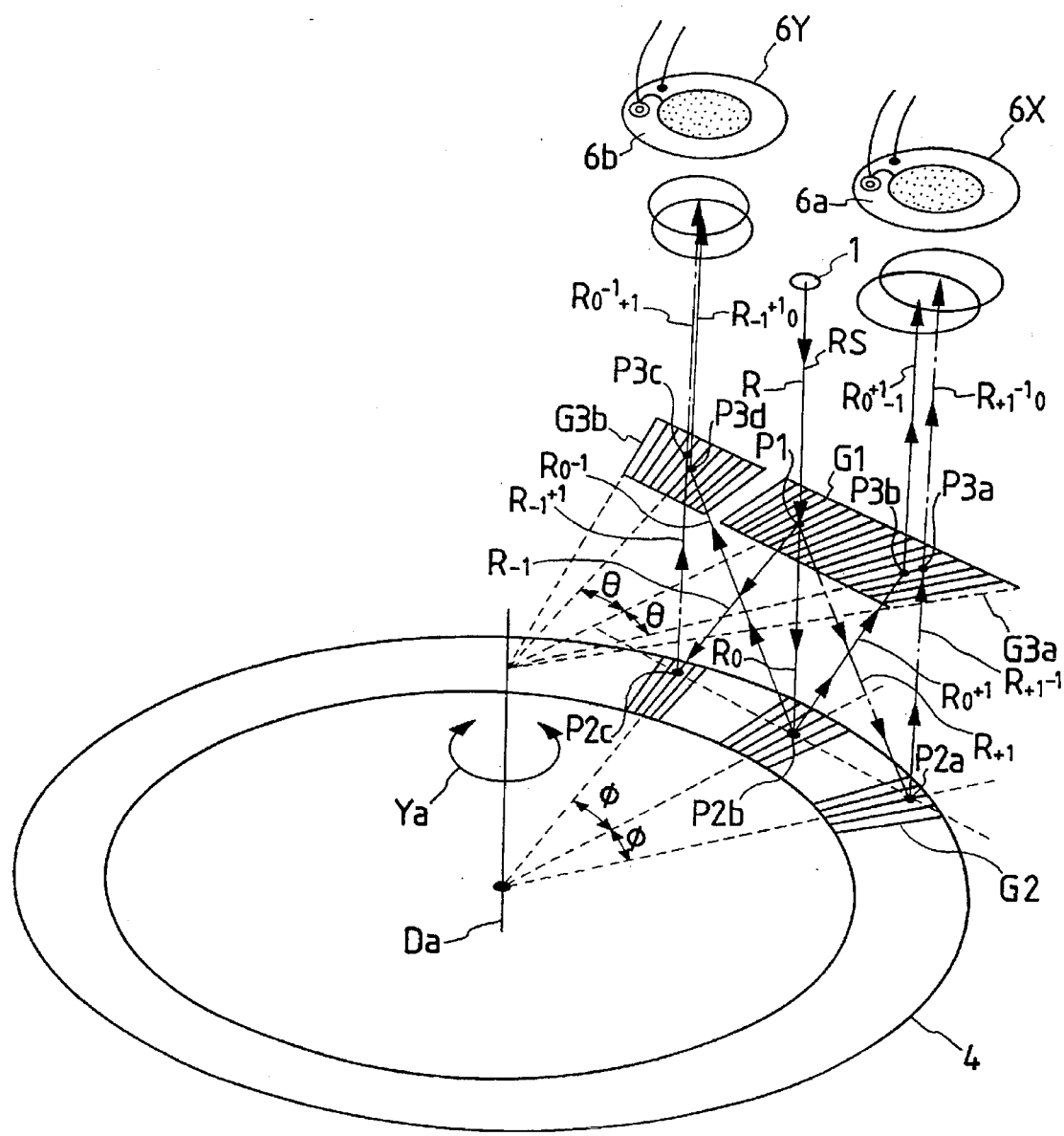
FIG. 9 is a perspective view of a main section of an embodiment 9 of the invention.

The embodiment 9 of FIG. 9 has a construction such that the optical path Rs of the light beam R from the light emitting device 1 in the embodiment 7 of FIG. 7 is made symmetrical and similar radial diffraction gratings and photosensitive devices are arranged on both sides. That is, three light beams are irradiated onto the diffraction grating G2, thereby forming interference signals on both sides of the optical path Rs.

In the diagram, the light beam R emitted from the light emitting device 1 is irradiated to the point P1 on the radial diffraction grating G1. Three light beams of the 0-th order diffraction light $R_0$, +1st order diffracted light $R_{+1}$, and −1st order diffracted light $R_{-1}$ produced by the light irradiation are irradiated to the points P2a, P2b, and P2c on the radial diffraction grating G2 recorded on the disk 4, respectively.

The light beam $R_0^{+1}$ which was +1st order diffracted at the point P2b is irradiated to the point P3b on the radial diffraction grating G3a. The light beam $R_{+1}^{-1}$ which was −1st order diffracted at the point P2a is irradiated to the point P3a on the radial diffraction grating G3a. The light beam $R_{-1}^{+1}$ which was +1st order diffracted at the point P2c is irradiated to the point P3c on the radial diffraction grating G3b. The light beam $R_0^{+1}$ which was −1st order diffracted at the point P2b is irradiated to the point P3d on the radial diffraction grating G3b.

The centers of the radial diffraction gratings G1, G3a, and G3b at the points P3a, P3b, P3c, and P3d are made to coincide and the numbers of gratings when they are calculated as a whole circumference are equalized. Thus, the every two light beams of both sides are emitted in parallel with each other.

The interference signal lights are received by photosensitive devices 6X and 6Y, so that electrical periodic signals are generated therefrom. Those electrical periodic signals are sine-wave-like signals of two periods when the disk 4 rotates by an angle corresponding to one pitch of the radial diffraction grating.

The embodiment has the following features.

(9-1) Since the interference signal lights are obtained from two positions of the radial diffraction grating G1, as shown in FIG. 9, by partially deviating the grating arranging phases of the radial diffraction grating G1 and by deviating the phases between the points P3a and P3b and between the points P3c and P3d by ¼ pitch, the phases of the bright and dark portions of the interference lights which enter the photosensitive devices 6X and 6Y can be deviated by 90° and the rotating direction of the disk 4 can be also discriminated.

(9-2) By properly deviating the centers of the radial diffraction gratings G1 and G2, it is also possible to cause a phase difference of the bright and dark portions of the interference lights which enter the photosensitive devices 6X and 6Y.

In each of the above embodiments, the diffraction order numbers of the diffraction lights are not limited to 0, +1st, and −1st but any other orders can be also used.

As photosensitive devices, it is also possible to construct in a manner such that two sets of photoelectric devices comprising comb-shaped photosensitive surfaces which are in engagement with each other are arranged so as to be neighboring and the phases are mutually deviated and signals of four phases which are deviated by 90° from each other are generated.

According to the above embodiments, the disk having fine gratings comprising diffraction gratings (radial gratings) of small diameters and a high density is used and two diffraction lights of predetermined orders which are obtained when the light beam is irradiated to the fine gratings are mutually properly interfered. Thus, it is possible to accomplish a rotary encoder which can detect rotational information of a rotary object (disk) at a high resolution while realizing the small and thin size of the whole apparatus.

Each of the above embodiments has the following features.

(2-a) A high resolution and a low inertia can be realized by using the disk on which radial gratings of very small diameters have been recorded at a high density (grating pitch: about 1.6 μm).

(2-b) The whole apparatus can be formed in a thin and small shape on the order of millimeter.

(2-c) The apparatus is of the unit type such that the disk and detecting head can be separately directly assembled into an apparatus to be measured. When they are assembled, they can be easily handled.

(2-d) The construction is very simple and the assembly adjustment is also easy.

(2-e) If the diffraction gratings for dividing and synthesizing the light beams have the same pitch like the embodiments, the apparatus can be applied as a linear encoder which can read the linear scales comprising the linear diffraction gratings of the same pitch.

What is claimed is:

1. An apparatus for detecting relative rotational information with an object to be measured having radial diffraction gratings, comprising:

a light source for emitting a light beam for measurement;

a separating diffraction grating for separating the light beam for measurement to a plurality of light beams;

a mixing diffraction grating for mixing at least one set of diffraction lights from a plurality of diffraction lights generated when the plurality of light beams are diffracted by the radial gratings, thereby forming at least one interference light beam; and a detecting section for detecting the at least one interference light beam and for generating a signal concerning the relative rotational information with the object to be measured, said detecting section having a light receiving area, wherein at least one of said separating diffraction grating, said mixing diffraction grating and said light receiving area is configured so that phases of interference light components of the at least one interference light beam entering said light receiving area substantially coincide with each other.

2. An apparatus according to claim 1, wherein said mixing diffraction grating mixes the diffraction lights from the radial diffraction gratings of +1st order diffracted light with a 0-th order light which are emitted from said separating diffraction grating.

3. An apparatus according to claim 2, wherein said separating diffraction grating and said mixing diffraction grating have arranging azimuths which are parallel with an arranging azimuth of the radial diffraction grating at an incident position of said 0-th order light.

4. An apparatus according to claim 2, wherein said separating diffracting grating and said mixing diffraction grating have arranging azimuths which are parallel with an arranging azimuth of the radial diffraction grating at an incident position of said 1st order diffracted light.

5. An apparatus according to claim 2, wherein said separating diffraction grating and said mixing diffraction grating have arranging azimuths which are parallel with an arranging azimuth of the radial diffraction grating at a middle point of incident positions of said 0-th order light and said +1st order diffracted light.

6. An apparatus according to claim 2, wherein said mixing diffraction grating has an arranging azimuth such that one set of diffraction lights to be mixed are emitted in parallel with each other.

7. An apparatus according to claim 2, wherein said separating diffraction grating and said mixing diffraction grating are radial diffraction gratings.

8. An apparatus according to claim 2, wherein said mixing diffraction grating has an arranging azimuth which is parallel with an arranging azimuth of the radial diffraction grating at an incident position of the 0-th order light, and said separating diffraction grating has an arranging azimuth which is parallel with the arranging azimuth of said radial diffraction grating at an incident position of said +1st order diffracted light.

9. An apparatus according to claim 1, wherein said detecting section has comb-shaped photosensitive devices arranged at substantially the same pitch as that of an interference fringe of the diffraction light beams formed on said mixing diffraction grating.

10. An apparatus according to claim 1, wherein said detecting section includes two comb-shaped photosensitive devices which are together arranged at substantially the same pitch as that of an interference fringe of the diffraction light beams formed on said mixing diffraction grating and are also arranged in a mutually engaging state.

11. An apparatus according to claim 1, wherein said mixing diffraction grating comprises:

a first diffraction grating section for mixing the diffraction lights from the radial diffraction gratings of a +1st order diffracted light and a 0-th order light which are emitted from said separating diffraction grating; and a second diffraction grating section for mixing the diffraction lights from said radial diffraction gratings of a −1st order diffracted light with the 0-th order light which are emitted from said separating diffraction grating, and wherein said detecting section has a plurality of photosensitive areas for respectively receiving interference light beams which are respectively emitted from said first and second diffraction grating sections.

12. An apparatus according to claim 11, wherein said first and second diffraction grating sections convert a plurality of diffraction lights to be mixed to parallel lights and emit them, respectively.

13. An apparatus according to claim 11, wherein each of said plurality of photosensitive areas has two comb-shaped photosensitive devices which are together arranged at substantially the same pitch as that of an interference fringe of the diffraction light beams formed on said mixing diffraction grating and are also arranged in a mutually mating state.

14. An apparatus according to claim 13, wherein a photosensitive section forms a difference signal of outputs from said two comb-shaped photosensitive devices of each of said photosensitive areas, and signals of two phases which are deviated from each other are obtained from the difference signal derived from every said area.

15. An apparatus according to claim 11, wherein said detecting section forms signals of two different phases from the interference light beams received by said photosensitive areas, respectively.

16. An apparatus for detecting relative rotational information with an object to be measured, comprising:

a radial diffraction grating provided so as to be rotated integrally with the object to be measured;

a light source to emit a light beam for measurement;

a separating diffraction grating for separating the light beam for measurement to a plurality of light beams;

a mixing diffraction grating for mixing at least one set of diffraction lights from a plurality of diffraction lights generated when the plurality of light beams are diffracted to said radial diffraction grating, thereby forming at least one interference light beam; and a detecting section for detecting said at least one interference light beam and for generating a signal regarding the relative rotational information with the object to be measured, said detecting section having a light receiving area, wherein at least one of said separating diffraction grating, said mixing diffraction grating and said light receiving area is configured so that phases of interference light components of the at least one interference light beam entering said light receiving area substantially coincide with each other.

17. An apparatus according to claim 16, wherein said radial diffraction grating is a reflecting type diffraction grating.

18. An apparatus according to claim 17, wherein said separating diffraction grating and said mixing diffraction grating are provided on a same board.

19. An apparatus according to claim 16, wherein said detecting section has at least one photosensitive device of a shape which is approximate to an interference fringe of said interference light beams.

20. An apparatus according to claim 16, wherein said mixing diffraction grating converts at least one set of diffraction lights to parallel lights and mixes them.

* * * * *

UNITED STATES PATENT AND TRADEMARK OFFICE
CERTIFICATE OF CORRECTION

PATENT NO. : 5,661,296
DATED : August 26, 1997
INVENTOR(S) : Ishizuka et al.

It is certified that error appears in the above-identified patent and that said Letters Patent is hereby corrected as shown below:

COLUMN 8:

Line 23, "$R_o^{-1}$" should read --$R_o^{+1}$--.

COLUMN 10:

Line 45, "diffracting" should read --diffraction--.

Signed and Sealed this

Fourteenth Day of July, 1998

Attest:

BRUCE LEHMAN

Attesting Officer        Commissioner of Patents and Trademarks